United States Patent Office

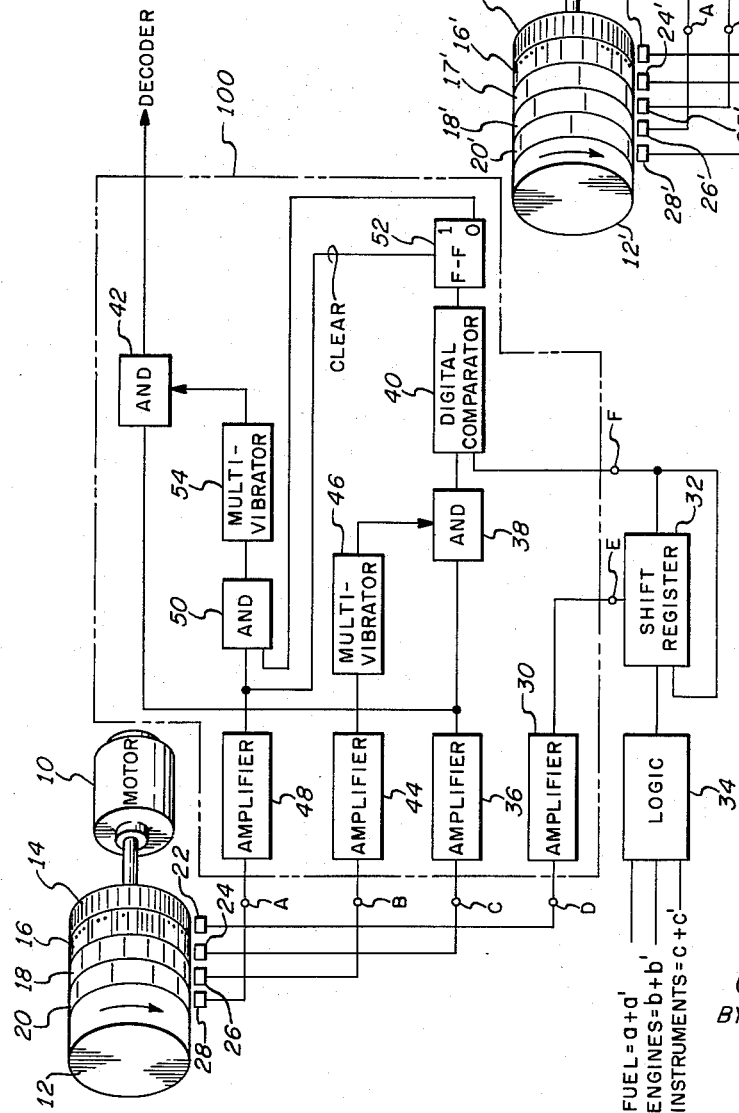

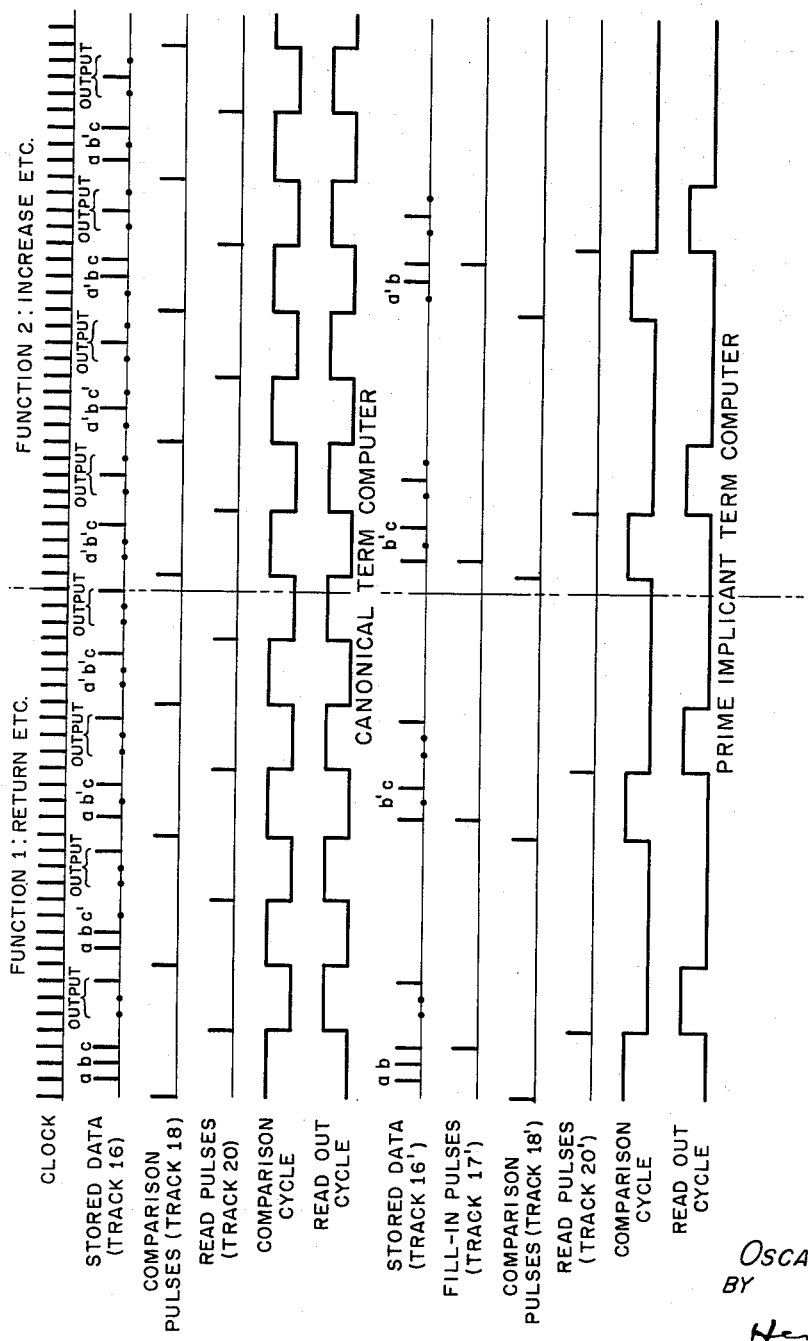

3,238,362
Patented Mar. 1, 1966

3,238,362
FUNCTION COMPUTER
Oscar Lowenschuss, Lexington, Mass., assignor to Sperry Rand Corporation, Great Neck, N.Y., a corporation of Delaware
Filed Oct. 27, 1961, Ser. No. 148,062
2 Claims. (Cl. 235—167)

This invention relates in general to computers and more particularly to an improved form of digital computer.

The operator of a vehicle or machine, e.g. the pilot of an airplane, is required continually to make decisions regarding its operation as environmental conditions change. For example, the pilot of an airplane must decide continually whether to continue flying to a predetermined destination (or to select an alternate route, or to turn on the radar, or to abandon ship, etc.) depending on the amount of fuel he has, the performance of the craft engines, the functioning of the craft instruments, etc.

Such variables as "fuel quantity," "engine performance" and "instrument performance" are reducible to switching, or two-state, variables, i.e. variables which represent either satisfactory or unsatisfactory conditions. Typically, the "fuel quantity" switching variable has the following values: a ONE for an unsatisfactory quantity of fuel, i.e. a quantity of fuel below a certain amount, and a ZERO for a satisfactory quantity of fuel. Likewise, the engine performance and instrument performance switching variables have respectively two values: ONEs for unsatisfactory performances and ZEROs for satisfactory performances.

Since every decision that the pilot makes depends on a different combination of conditions, i.e. a different combination of switching variables, a Boolean expression in canonical form may be written for each such decision. (The canonical form of a Boolean expression includes every possible combination of all variables for which a particular decision should be made, each such combination being hereafter called a canonical term.) For example, the decisions "to return to the point of departure" and "to increase altitude" respectively might be made in accordance with the following Boolean expressions:

Return etc.$=abc+abc'+ab'c+a'b'c$
Increase etc.$=a'b'c+a'bc'+a'bc+ab'c$ where $a$ represents a condition where the quantity of fuel is "unsatisfactory,"
$b$ represents a condition where the engines are performing "unsatisfactorily,"
$c$ represents a condition where the craft instruments are performing "unsatisfactorily," and
primed terms represent "NOT unsatisfactory" or "satisfactory" conditions.

If, in solving either expression, a ONE results, the decision of that particular expression ist to be effected; otherwise, i.e. if a ZERO results, the decision is not to be made.

As is known, canonical forms of Boolean expressions may, for ease of evaluation, be reduced to prime implicant forms by manipulation. (The prime implicant form of a Boolean expression contains only those necessary combinations of variables for which a particular decision should be made, each such combination being hereafter called a prime implicant term.) For example, the "Return etc." expression is reducible to $ab+b'c$ and the "Increase etc." expression is reducible to $b'c+a'b$.

Apparatus embodying the invention solves either canonical or prime implicant forms of Boolean switching equations by means of conventional, but minimized, digital computing equipment, e.g. the whole arithmetic unit is but a single flip-flop circuit, thereby obviating the need for resort to switch-tree circuits to solve such equations. (Switch-tree circuits are limited in their application since they are difficut to alter when variables change, e.g. when fuel capacities are changed, when new routes are flown, etc.)

A principal object of the invention is to provide digital computing apparatus for computing the values of functions of switching variables.

Another object of the invention is to provide digital computing apparatus for the solution of functions of switching variables wherein such functions are provided in their canonical forms.

Another object of the invention is to provide a digital computer for the solution of functions of switching variables wherein such functions are presented in their prime implicant forms.

The invention will be described with reference to the figures wherein:

FIG. 1 is a block diagram of apparatus embodying the invention,

FIG. 2 is a diagram useful in describing the operation of the apparatus of FIG. 1, FIG. 3 is a block diagram of a presently preferred form of the invention, FIG. 4 is a diagram useful in describing the operation of the apparatus of FIG. 3.

Referring to FIG. 1, a motor 10 drives a magnetic storage device or drum 12 which, for purposes of the invention, has at least four tracks 14, 16, 18 and 20; data, in the form of pulses, is stored on each of the tracks and read respectively by read heads 22, 24, 26 and 28. Clock pulses, stored on the track 14, are applied to an amplifier 30 which, in turn, applies its output pulses to a shift register 32 to step that register in synchronism with the rotation of the drum 12. The shift register 32 may be of the type shown and described in Handbook of Automation, Computation and Control, volume 2, page 15—15, Fig. 19, John Wiley and Sons, Inc., New York. Whereas in a practical embodiment of the invention many variables are circulated within the shift register 32, the invention is described, for simplicity, with only three variables in circulation, e.g. the heretofore mentioned variables $a'$, $b'$, and $c'$, such variables being inserted into the shift register 32 through a logic circuit 34. So long as the variables remain constant, the shift register 32 circulates them; however, when a variable changes, e.g. when the fuel quantity becomes "unsatisfactory" ($a'$ becomes $a$), the logic circuit 34 clears the shift register 32 and inserts therein the new form of data, i.e. the shift register 32 is made to circulate $a$, $b'$, and $c'$.

The pulsed data stored on the magnetic drum track 16 is applied to an amplifier 36, the output pulses of which are applied through an AND circuit 38 to a digital comparator 40 when the AND circuit 38 is enabled. The digital comparator 40, which may be either a half adder or an EXCLUSIVE OR circuit of the type described in Handbook of Automation, Computation and Control, volume 2, page 5–18, receives also the circulating pulsed data from the shift register 32 and provides an output pulse only when the shift register output data differs from the data which passes through the AND circuit 38, e.g. when the binary sum (ignoring carries) of the data applied to the comparator is greater than zero. The pulsed data at the output of the amplifier 36 is applied also to a decoder (or other output device) when an AND circuit 42 is enabled.

The AND circuit 38 is enabled as follows: Pulses read from the storage drum track 18 by the read head 26 are applied to an amplifier 44 and thence to a monostable multivibrator 46, the output of which is applied to and enables the AND circuit 38. The multivibrator 46 is designed to produce a square wave output pulse the width of which is equivalent to the time period of four clock pulses.

The AND circuit 42 is enabled as follows: Pulses read from the magnetic drum track 20 by the read head 28 are applied to an amplifier 48 and thence to an AND gate 50. The AND gate 50 receives also a gate-opening signal from a comparator-responsive flip-flop circuit 52 (which is the entire arithmetic unit employed by the invention) whenever the flip-flop circuit 52 is in its ZERO state, i.e. when the digital comparator 40 produces no output signal. Therefore, when the flip-flop circuit 52 is in its ZERO state at the same time that a pulse is read by the read head 28, the AND gate 50 produces an output pulse which is applied to a multivibrator 54, the multivibrator 54 being exactly the same as the multivibrator 46. The multivibrator 54 outputs square wave is applied then to the AND circuit 42 to enable that circuit for the duration of four clock pulses. The pulses appearing at the output of the amplifier 48 are applied also to the flip-flop circuit 52 to clear that circuit and ready it for the next digital comparison.

FIG. 2 is provided to show how the above-mentioned decisions, i.e. "Return etc." and "Increase etc.," may be effected by means of the apparatus of FIG. 1. Each decision has the terms of its respective canonical expression stored, by means of pulses, on the magnetic drum track 16, the unprimed variables being represented by pulses, i.e. ONEs, and the primed variables being represented by the absence of pulses, i.e. ZEROs. Interspersed between pairs of canonical terms on the track 16 are output messages, such messages being always the same for a particular canonical expression. The output messages for the decisions "Return etc." and "Increase etc." have been arbitrarily selected respectively as 001 and 010 which, upon being decoded, may operate suitable indicators. Pulses, hereafter referred to as comparison pulses, are suitably positioned on the track 18 so that they occur one clock pulse prior to the start of each canonical term. Pulses, called read pulses, are suitably positioned on the track 20 so that they occur one clock pulse prior to the start of an output message.

When a comparison pulse is applied to the amplifier 44, the AND circuit 38 is enabled for a comparison cycle. (See FIG. 2.) During the comparison cycle a canonical term, e.g. $abc$ as represented by 111, passes through the AND circuit 38 and into the digital comparator 40. At the same time, the shift register 32 synchronously applies pulsed data representing the actual values of the variables to the comparator 40. Under ideal conditions the shift register contains "satisfactory" values of the switching variables only, i.e. the register contains $a'b'c'$ or 000. The result of comparing, for example, 111 with 000 in the digital comparator 40 produces, as mentioned earlier, an output pulse which drives the flip-flop circuit 52 to its ONE state. Consequently, the AND circuit 50 cannot produce an output pulse when a read pulse from the track 20 is applied thereto, thereby preventing the AND circuit 42 from becoming enabled and prohibiting an output message from passing therethrough during a read out cycle (see FIG. 2).

If, in the above example, the shift register 32 contained "unsatisfactory" values of switching variables, i.e. the register circulated $abc$ or 111, the digital comparator would have had no output signal and the flip-flop circuit 52 would have remained in its ZERO state. Then, the AND circuit 50 would have been free to pass a track 20 read pulse to trigger the multivibrator 54 to enable the AND circuit 42, thereby permitting an output message to be applied to the decoder during the read out cycle. After pulses representing the canonical terms calling for the decision "Return etc." have passed under the read head 24, pulses representing canonical terms for the decision "Increase etc." pass thereunder.

As stated earlier, canonical forms of Boolean expressions are reducible to prime implicant forms, the apparatus of FIG. 3 being provided for their evaluation. Referring to FIG. 3, the circuit contained within the dashed lines 100 of FIG. 1 is shown connected to contacts at points A through F. Clock pulses from a track 14' on a magnetic drum 12' are read by a read head 22' and applied to the contact at point D. Comparison pulses stored on a drum track 18' are read by a read head 26' and applied to an OR circuit 27, the OR circuit 27 also receiving output pulses from a shift register 32'. The shift register 32', functioning exactly like the shift register 32 of FIG. 1, receives pulses representing values of all variables from a logic circuit 34'. Read pulses are read from a magnetic drum track 20' by a read head 28' and applied to the contact at point B. The output data from the OR circuit 27 is applied to the contact at point F.

Because prime implicant terms usually have fewer variables than the total number of variables, e.g. the prime implicant term $ab$ has no variable $c$, the apparatus of FIG. 3 is so modified to produce a "don't care" situation whenever a "missing" variable of a prime implicant term is compared with the "actual value" variable circulating in the register 32. Referring to FIGS. 3 and 4, the modification is as follows: Pulse groups representing the prime implicant terms are stored on a magnetic drum track 16; even though a term has a "missing" variable, a pulse is nevertheless stored at the proper place for that variable on the track 16. In addition, a fifth track 17 stores pulses, hereafter called "fill in pulses," so suitably situated that they are read by the read head 25 when the "missing" variables are read.

With, for example, the shift register 32 circulating $abc$, i.e. 110, and the read head 24 reading the modified prime implicant term $ab$, i.e. 111, the digital comparator 40 produces no output pulse, thereby causing the decoder to receive a decision message. This is because the OR circuit 27 produces an output pulse train 111 (the last ONE being provided by the fill in pulse from the track 17') at the same time the modified prime implicant pulse train is read.

If, in the above example, the register 32' had circulated the variables $abc$, i.e. 111, the comparator would still produce no output signal, this being because the modified prime implicant term and the output from the OR circuit 27 are again both 111.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for computing the value of a function of a plurality of switching variables comprising a device for storing the canonical terms of said function when said function has a particular one of its two values and also storing interspersed with said canonical terms output messages all of which are identical, gate means adapted to receive said output messages, means providing a term representing the actual values of all said variables, means comparing each of said canonical terms with said term representing the actual values of all said variables, and means responsive to open said gate means when one of said canonical terms is exactly the same as said term representing the actual values of all said variables and thereby permit said output message to be gated out.

2. Apparatus for computing the value of a function of a plurality of switching variables comprising a device for storing the prime implicant terms of said function when said function has a particular one of its two possible values and also storing interspersed with said prime implicant terms output messages all of which are identical, gate means adapted to receive said output messages, means providing a term representing the actual values of all said variables, means comparing the variables in each of said prime implicant terms with their respective actual values, and means responsive to open said gate means when the values of the variables in any one of said prime implicant terms is exactly the same as the values of the variables with which they are compared thereby permitting said output message to pass through said gate means.

References Cited by the Examiner

UNITED STATES PATENTS

| | | | |
|---|---|---|---|
| 2,600,744 | 6/1952 | Eckert et al. | 235—177 |
| 2,892,183 | 6/1959 | Selmer | 340—174 |
| 3,017,102 | 1/1962 | Andrews | 235—177 |
| 3,167,740 | 1/1965 | King et al. | 235—177 |

OTHER REFERENCES

Handbook of Automation Computation and Control, volume 2, Wiley & Sons, Inc., 1959.

Ledley, R. S.: Digital Computer and Control Engineering, McGraw-Hill, 1960, QA 76.5 L4 C.2, pages 324–326.

ROBERT C. BAILEY, *Primary Examiner.*

DARYL W. COOK, MALCOLM A. MORRISON,
*Examiners.*